United States Patent
Law et al.

(10) Patent No.: US 9,717,351 B2
(45) Date of Patent: Aug. 1, 2017

(54) SYSTEMS AND METHODS FOR PROVIDING ARTICULATING POINT-OF-SALE APPARATUSES OR DEVICES

(71) Applicant: FIRST DATA CORPORATION, Greenwood Village, CO (US)

(72) Inventors: William Sauway Law, San Francisco, CA (US); Heather Lynn Klaubert, Menlo Park, CA (US); Sung Hoon Kim, Palo Alto, CA (US); Scott McKinley DeWinter, Oakland, CA (US); Christopher Loew, Palo Alto, CA (US); David Frederick Lyons, Palo Alto, CA (US); Leonard Speiser, Mountain View, CA (US); John Beatty, Mountain View, CA (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 0 days.

(21) Appl. No.: 14/779,506

(22) PCT Filed: Mar. 28, 2014

(86) PCT No.: PCT/US2014/032211
§ 371 (c)(1),
(2) Date: Sep. 23, 2015

(87) PCT Pub. No.: WO2014/160959
PCT Pub. Date: Oct. 2, 2014

(65) Prior Publication Data
US 2016/0051067 A1    Feb. 25, 2016

Related U.S. Application Data

(60) Provisional application No. 61/806,560, filed on Mar. 29, 2013.

(51) Int. Cl.
*H05K 7/00* (2006.01)
*H05K 5/00* (2006.01)
(Continued)

(52) U.S. Cl.
CPC ........... *A47F 9/046* (2013.01); *F16M 11/041* (2013.01); *F16M 11/043* (2013.01);
(Continued)

(58) Field of Classification Search
CPC ................................................. H05K 7/20145
(Continued)

(56) References Cited

U.S. PATENT DOCUMENTS

2005/0036283 A1* 2/2005 Hillman .................. F16M 11/04
                                                                361/679.21
2005/0057893 A1    3/2005 Homer et al.
(Continued)

FOREIGN PATENT DOCUMENTS

| EP | 0244621 A1 | 11/1987 |
|----|------------|---------|
| JP | H1139125 A | 2/1999 |
| WO | 0034843 A1 | 6/2000 |

OTHER PUBLICATIONS

International Search Report for Application No. PCT/US2014/032211 mailed Jul. 29, 2014.

*Primary Examiner* — Jerry Wu
(74) *Attorney, Agent, or Firm* — Eversheds Sutherland (US) LLP (57) ABSTRACT

Embodiments of the disclosure can include systems and methods for providing articulating point-of-sale (POS) apparatuses or devices, such as displays. In one embodiment, an articulating point-of-sale (POS) display assembly may include a base and a movable arm attached to the base. The movable arm may be configured to move from a first position to a second position with respect to the base. The
(Continued)

assembly may further include a pivotable display device attached to the movable arm. The pivotable display device may be configured to pivot from a third position to a fourth position with respect to the movable arm. The assembly may also include an arm joint attaching the movable arm to the base, and a pivot joint attaching the pivotable display device to the movable arm.

13 Claims, 9 Drawing Sheets (51) Int. Cl.

| | | |
|---|---|---|
| A47F 9/04 | (2006.01) | |
| F16M 11/04 | (2006.01) | |
| F16M 11/08 | (2006.01) | |
| F16M 11/10 | (2006.01) | |
| F16M 11/20 | (2006.01) | |
| G07G 1/00 | (2006.01) | |
| F16M 11/14 | (2006.01) | |
| F16M 11/28 | (2006.01) | |
| F16M 11/06 | (2006.01) | |
| G06F 1/16 | (2006.01) | |
| G07G 1/01 | (2006.01) | |

(52) U.S. Cl.
CPC ............ *F16M 11/06* (2013.01); *F16M 11/08* (2013.01); *F16M 11/10* (2013.01); *F16M 11/14* (2013.01); *F16M 11/2014* (2013.01); *F16M 11/2021* (2013.01); *F16M 11/28* (2013.01); *G06F 1/1601* (2013.01); *G07G 1/0018* (2013.01); *G07G 1/01* (2013.01); *A47F 2009/041* (2013.01); *F16M 2200/063* (2013.01)

(58) Field of Classification Search
USPC .................................................... 361/679.21
See application file for complete search history.

(56) References Cited

U.S. PATENT DOCUMENTS

2007/0058329 A1   3/2007   Ledbetter et al.
2012/0131826 A1   5/2012   Dai
2012/0224200 A1   9/2012   Nihashi \* cited by examiner

SYSTEMS AND METHODS FOR PROVIDING ARTICULATING POINT-OF-SALE APPARATUSES OR DEVICES

FIELD OF THE DISCLOSURE

The disclosure generally relates to a point-of-sale (POS) display, and more particularly relates to systems and methods for providing articulating point-of-sale (POS) apparatuses or devices, such as displays.

BACKGROUND

Point-of-sale (POS) systems may require multiple interfaces for different people involved in a transaction. For example, a POS system may include one display for merchants or retailers to initiate or modify a transaction. The POS system may include another display to present information associated with the transaction to a customer. The POS system may require merchant-customer interaction, coordination, and communication between the different displays.

BRIEF SUMMARY OF THE DISCLOSURE

Some or all of the above needs and/or problems may be addressed by certain embodiments of articulating point-of-sale (POS) displays of the disclosure. The disclosure provides certain embodiments of systems and methods for providing articulating point-of-sale (POS) apparatuses or devices, such as displays.

According to an embodiment, an articulating point-of-sale (POS) display may include a base. One or more arms may extend from the base. Each arm may have a pivotal arm joint for attaching a display. The display may be attached to the assembly by the pivotal arm joints.

According to another embodiment, a method for providing an articulating point-of-sale (POS) display assembly can include providing a base; attaching a movable arm to the base with an arm joint, the movable arm configured to move from a first position to a second position with respect to the base; and attaching a pivotable display device to the movable arm with a pivot joint, the pivotable display device configured to pivot from a third position to a fourth position with respect to the movable arm; wherein the pivotable display device is configured to rotate with respect to the movable arm; and the movable arm is configured to rotate with respect to the base.

Other embodiments, systems, methods, features, and aspects for providing an articulating point-of-sale apparatus, device, or display will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Described below are embodiments of an articulating point-of-sale (POS) display assembly (as well as individual components of the articulating POS display assembly). In certain embodiments, having a single display at a POS allows a merchant to work on a transaction and rotate the POS device or display to the customer for completion of the transaction. Additionally, having a single display in a POS display system enables a relatively simpler architecture for creating and processing transactions. Furthermore, the POS device or display can be ergonomically rotated and/or positioned for both the merchant and/or customer to facilitate a transaction.

In one embodiment, an articulating POS display assembly may include a base, a first arm, a second arm, and a display. The first and second arm may extend substantially orthogonally from the base and on opposite ends of the base. The display may be pivotally attached to the first arm and the second arm. The display may have a horizontal pivot axis through a centerline of the display.

In one embodiment, the articulating POS display assembly may include a base, an adjustable arm extending from the base, and a POS display. The base may include a front angled portion and a rear angled portion. The adjustable arm may include a first arm joint configured for pivotal attachment to the display and a second arm joint configured for pivotal attachment to the base. The POS display may be pivotally attached to the second arm joint. The POS display may be adjustable to rest on one of the front angled portion of the rear angled portion of the base.

In one embodiment, the articulating POS display assembly may include a base, a plurality of arms extending from the base and the POS display. The plurality of arms extending from the base may be pivotally attached to the base. Each of the plurality of arms may include an arm joint configured for adjustable attachment to the POS display. The POS display may be attached to each of the plurality of arms via the respective arm joint of the plurality of arms.

In one embodiment, the articulating POS display assembly may include a base, an arm extending from the base, an arm joint on the second portion of the arm, and a POS display. The arm may include a first portion substantially orthogonal to the base and a second portion at a skew angle. The POS display may be attached to the arm joint.

In one embodiment, the articulating POS display assembly may include a base, a pivotal joint connected to a corner of the base, and a POS display attached to the base via the pivotal joint.

In one embodiment, the articulating POS display assembly may include a base, a rotatable arm extending from the base, a hinge on the second portion of the rotatable arm, and a POS display attached to the rotatable arm via the hinge.

In one embodiment, the articulating POS display assembly may include a base comprising a first portion of a latch. The mount assembly may include a pivotal spring-loaded arm attached to the base. The mount assembly may include a POS display attached to the pivotal spring-loaded arm, wherein the POS display comprises a second portion of the latch.

In one embodiment, the articulating POS display assembly may include a base, an arm extending from the base and positioned toward a first side of the base, and a POS display comprising a card reader positioned on a second side of the based opposite the first side of the base.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

Figure 1:
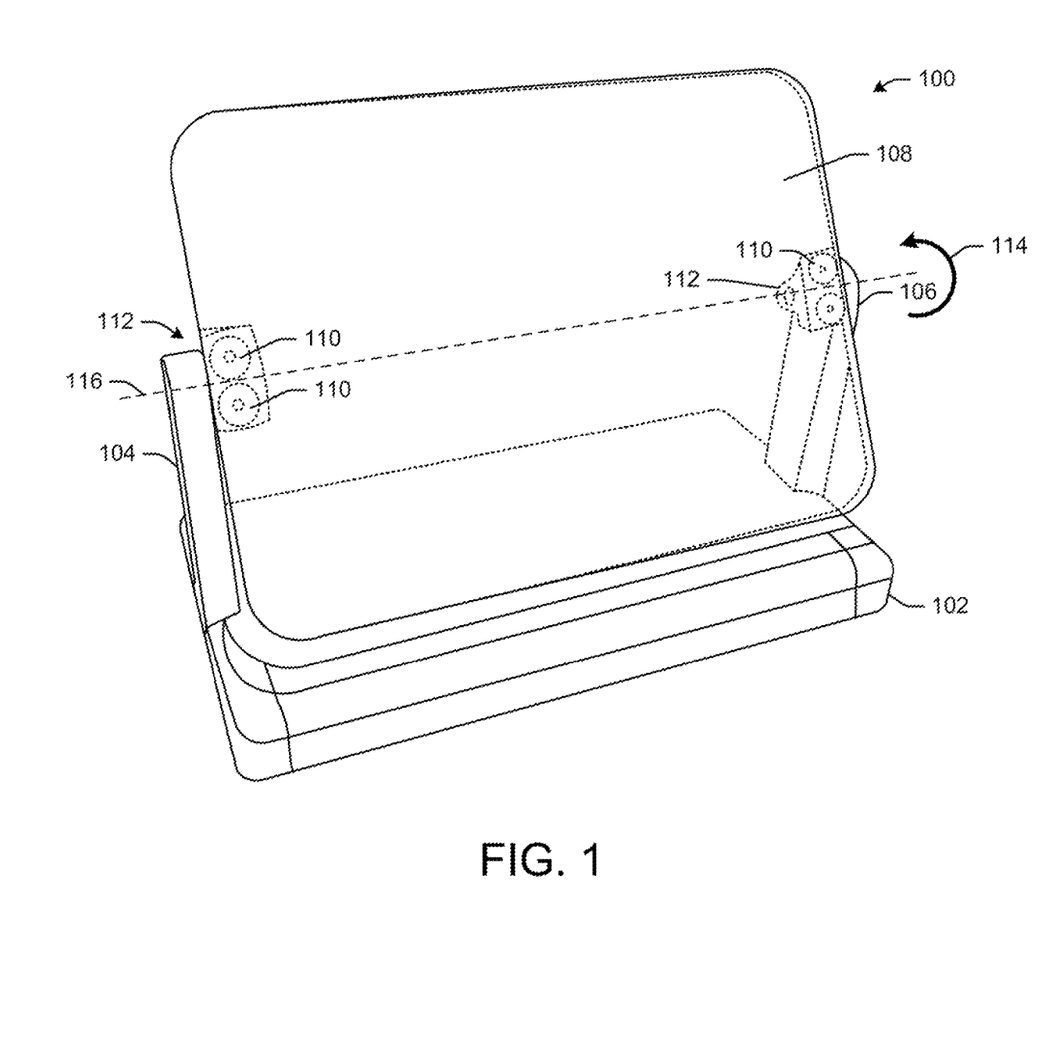
FIG. 1 schematically depicts a side-mounted horizontal pivot mounted articulating point-of-sale (POS) display assembly in accordance with one or more embodiments of the disclosure.

Now referring to FIG. 1, a side-mounted horizontal pivot articulating POS display assembly 100 is depicted in accordance with one or more embodiments of the disclosure. In one embodiment, the articulating POS display assembly 100 may include a base 102, a first arm 104, a second arm 106, and a POS display 108. The first arm 104 and second arm 106 may extend substantially orthogonally from the base 102 and on opposite ends of the base 102. The first arm 104 may be substantially aligned with and/or substantially parallel to the second arm 106. The POS display 108 may be pivotally attached to the first arm 104 and the second arm 106. The POS display 108 may be attached to the first arm 104 and the second arm 106 by, for example, suction cups 110. The suction cups 110 may be formed from any suitable plastic, rubber, or other material capable of securely attaching to a surface of the POS display 108. Any number of suction cups 110 may be used to secure the POS display 108. The suction cups 110 may be a part of or may be attached to rotating portions 112 of the first arm 104 and the second arm 106. The rotating portions 112 may be formed as a part of the first and second arms 104, 106, or may be attached to the first and second arms 104, 106, for example with a ball and socket joint. The rotating portions 112 may be configured to rotate with respect to the first and second arms 104, 106, thereby allowing rotation of the POST display 108 about the first and second arms 104, 106. The POS display 108 may have a horizontal pivot axis through a centerline 116 of the POS display 108 corresponding to the point of attachment of the POS display 108 to the first arm 104 and the second arm 106, where the POS display 108 rotates about the first and second arms 104, 106 along with the rotating portions 112. For example, the POS display 108 may rotate in direction 114 about the first arm 104 and the second arm 106.

The horizontal pivot axis, which may run through the centerline 116 or near the centerline 116 of the POS display 108, may be the axis about which the POS display 108 pivots and may correspond to the center of mass of the POS display 108. The POS display 108 may roll or otherwise rotate smoothly or in predefined sections from one side of the mount assembly 100 to another. In some embodiments, stops or predefined sections may be set at different angles or positions about the first and second arms 104, 106 for the POS display 108. In some embodiments, magnets, protrusions, or other types of detenting stops may be used enable the POS display 108 to be set and stopped at different angles. The stops may resolve any pressure exerted by users of the system on the POS display 108 (e.g., tapping or swiping) which may be less than a force sufficient to articulate the POS display 108. In some embodiments, the breakaway torque or pressure, or force, may be set to be greater than the input tap or contact of a user but less than a pressure that may be too difficult for a user to adjust the mount assembly.

Figure 2:
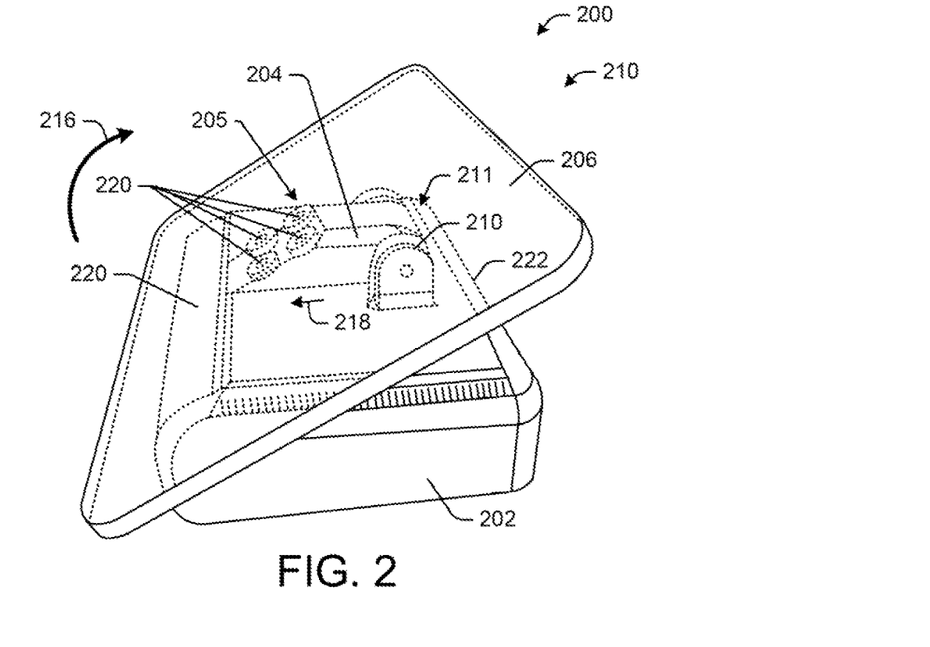
FIGS. 2 and 3 schematically depict a center-mounted horizontal pivot mounted articulating POS display assembly in different positions in accordance with one or more embodiments of the disclosure.
Figure 3:
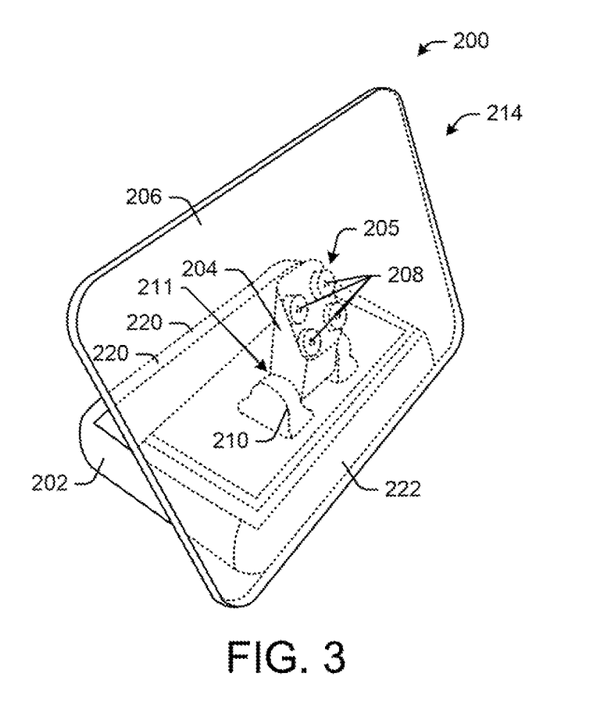

Now referring to FIGS. 2 and 3, a center-mounted horizontal pivot articulating POS display assembly 200 is depicted in accordance with one or more embodiments of the disclosure. In the embodiment illustrated in FIG. 2, the POS display assembly 200 may include a base 202, an adjustable arm 204 extending from the base 202, and a POS display 206. The adjustable arm 204 may be connected to the base 202 via connections 211. In some embodiments, connections 210 may be a ball and socket joint, or any other connection or attachment that is configured to allow adjustable arm 204 to move or rotate about the base 202 in direction 216. The adjustable arm 204 may include a first arm joint 205 configured for pivotal attachment to the POS display 206 and a second arm joint 210 configured for pivotal attachment to the base 202. In some embodiments, adjustable arm 204 may be extendable, for example adjustable arm 204 may be configured to extend and/or move in direction 218 away from the base 202. In certain embodiments, the adjustable arm 204 may be telescoping. The adjustable arm 204 may further include the first arm joint 205. The first arm joint 205 may attach the adjustable arm 204 to the POS display 206. In some embodiments, the POS display 206 may be attached directly to the adjustable arm 204, while in other embodiments, the POS display 206 may be positioned in a holder or cradle (not shown) that is attached to the adjustable arm 204. The first arm joint 205 may include suction cups 208 configured to removably attach the POS display 206 to the adjustable arm 204. The first arm joint 205 may further be configured to rotate about the adjustable arm 204, thereby allowing the POS display 206 to rotate about the adjustable arm 204. For example, the first arm joint 205 may be a ball and socket joint or the like.

The base 202 may include a front angled portion 220 and a rear angled portion 222. The front angled portion 220 and the rear angled portion 222 may serve as backstops, rests, and/or supports for the POS display 206 when the POS display 206 is in a first position 212, as shown in FIG. 2. For example, the first position 212 may be such that the POS display 206 is facing a merchant. In the first position 212, the POS display 206 may rest on the front angled portion 220 of the base 202. The POS display 206 may be pivotally attached to the adjustable arm 204. The POS display 206 may be adjustable to rest on one of the front angled portion 220 or the rear angled portion 222 of the base 202.

Referring now to FIG. 3, the POS display 206 is shown in a second position 214, for example facing a customer, after rotating in direction 216 from the first position 212. In the second position 214, the POS display 206 may rest on the rear angled portion 222 of the base 202. The adjustable arm 204 may be positioned upright, as shown in FIG. 3, when the POS display 206 is in the second position 214. In other embodiments, the adjustable arm 204 may be in a different position when the POS display 206 is in the second position 214.

In some embodiments, the center-mounted horizontal pivot mount articulating POS display assembly 200 may have a pivot point with respect to the POS display 206 in a way such that the POS display 206 rests a bottom edge on the base 202 in a way to create a 3-point stance. For example, the adjustable arm 204 may attach to the POS display 206, and two corners of the POS display 206 may rest on a side of the base 202 in a kinematic scheme. In some embodiments, the base 202 may have different or additional angled sides or surfaces that enable the POS display 206 to rest on the base 202 at different angles.

Figures 4, 5:
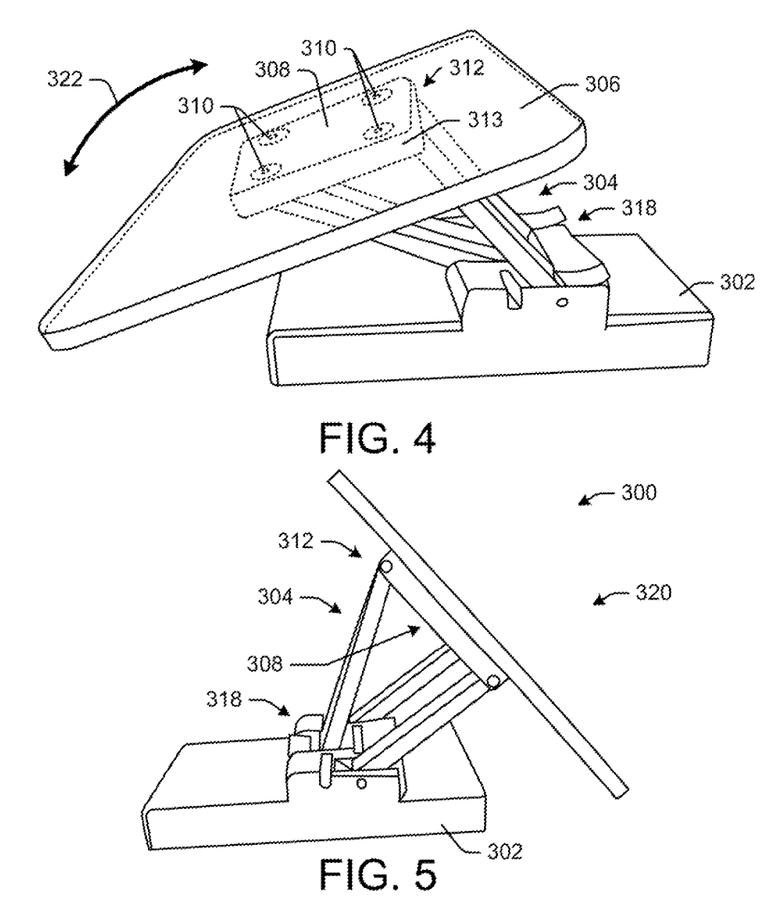
FIGS. 4 and 5 schematically depict a four-bar linkage mounted articulating POS display assembly in different positions in accordance with one or more embodiments of the disclosure.

Now referring to FIGS. 4 and 5, a four-bar linkage mounted articulating POS display assembly 300 is depicted in accordance with one or more embodiments of the disclosure. In one embodiment, the articulating POS display assembly 300 may include a base 302, a plurality of arms 304 extending from the base 302, and a POS display 306. The plurality of arms 304 extending from the base 302 may be pivotally attached to the base 302 via attachment 318. Each of the plurality of arms 304 may be individually attached or connected to the base 302, or the plurality of arms 304 may be connected to the base 302 at a single connection point. Each of the plurality of arms 304 may include an arm joint 312 configured for adjustable attachment to the POS display 306. In some embodiments, the plurality of arms 304 may be connected at a support 313 that the POS display 306 may be mounted on. As shown in FIG. 4, the support 313 may include suction cups 310 configured to allow the POS display 306 to be removably attached to the support 313. In other embodiments, the plurality of arms 304 may be connected directly to the POS display 306. The POS display 306 may be attached to each of the plurality of arms 304 via the respective arm joint of the plurality of arms 304. For example, each arm joint may include a suction cup configured to removably attach the POS display 306 to each respective arm of the plurality of arms 304.

The attachment 318 may be configured to allow the plurality of arms 304 to rotate in direction 322 and in reverse about base 302, thereby allowing the POS display 306 to rotate about the base 302. The attachment 318 may include predefined stop points where the POS display 306 may be positioned without fully rotating about base 302. Referring to FIGS. 4 and 5, in FIG. 4, the articulating POS display assembly 300 is shown with POS display 306 in a first position 314, for example such that the POS display 306 is facing a merchant. The POS display 306 may rotate in direction 322 about the base 302 to come to a second position 320 shown in FIG. 5, which may correspond to a customer position, thereby allowing the customer to view the POS display 306.

In some embodiments, the angle of the POS display 306 may be set by the kinematic linkage and the pivot locations of the mount assembly or attachment 318. In some embodiments, the mount assembly or attachment 318 may be configured to allow the POS display 306 to articulate from merchant to customer facing modes and may translate a customer facing POS display 306 much closer to the customer. This may allow for a wider counter-depth which may provide better ergonomics for the customers and merchants.

Figure 6:
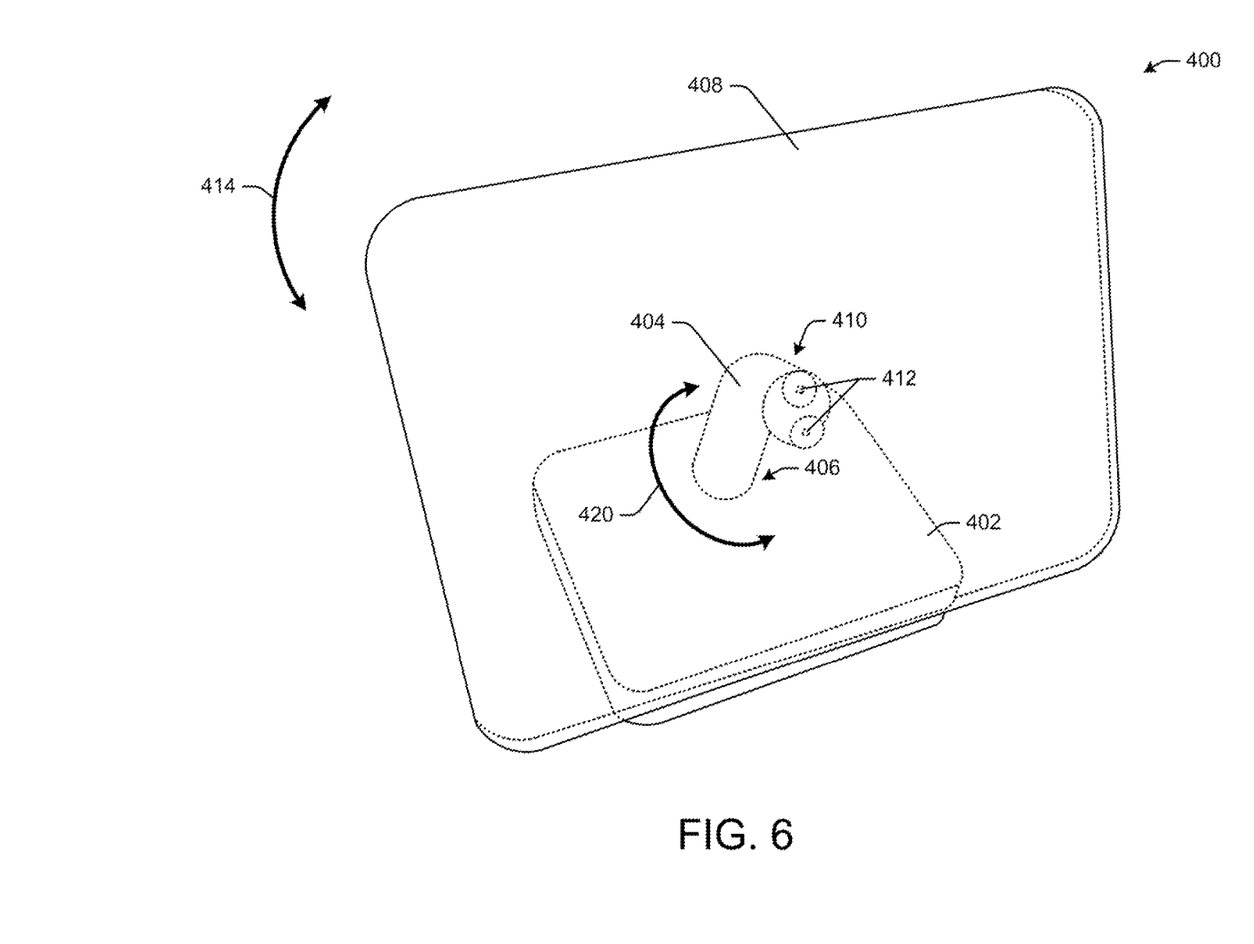
FIG. 6 schematically depicts a center-mounted angled vertical pivot mounted articulating POS display assembly in accordance with one or more embodiments of the disclosure.

Now referring to FIG. 6, a center-mounted angled vertical pivot mounted articulating POS display assembly 400 is depicted in accordance with one or more embodiments of the disclosure. In the illustrated embodiment, the articulating POS display assembly 400 may include a base 402, an arm 404 extending from the base 402, an arm joint 406 connecting the arm 404 to the base 402, and a POS display 408 attached to the arm 404 via joint 410. The arm 404 may be straight, curved, or bent as shown in FIG. 6. The arm 404 may include a first portion substantially orthogonal to the base and a second portion at a skew angle. The POS display 408 may be attached to the arm 404 at joint 410. Joint 410 may include suction cups 412 configured to removably attach the POS display 408 to the arm 404. Other joints configured to removably attach the POS display 408 to the arm 404 may be used, such as Velcro, adhesive, or the like.

The joint 410 may be configured to allow the POS display 408 to rotate about the arm 404 in direction 414, such that the POS display 408 may be viewed in a horizontal or vertical orientation, or at some angle in between horizontal and vertical. The joint 410 may be configured to lock in certain predetermined positions while rotating in direction 414, for example a snap lock in the horizontal and vertical positions. The arm joint 406 connects the arm 404 to the base 402. The arm joint 406 may be configured to allow the arm 404 to rotate with respect to the base 404, for example in direction 420. The arm joint 406 may therefore allow the POS display 408 to be rotated from a merchant view to a customer view, for example.

In some embodiments, the center-mounted angle vertical pivot mounted articulating POS display assembly 400 may allow the POS display 408 to be pivoted around or on the arm 404. In some embodiments, the POS display 408 may be set to different display angles as it pivots around or on the arm 404. In some embodiments, the mount assembly or arm joint 406 may permit 180 degree rotation of the POS display 408 around the arm 404 at different set angles (e.g., 30 degrees, 60 degrees, or the like). The portion of the arm 404 attached to the POS display 408 may be at an angle. Once it pivots, the angle of the POS display 408 may change as well.

Figure 7:
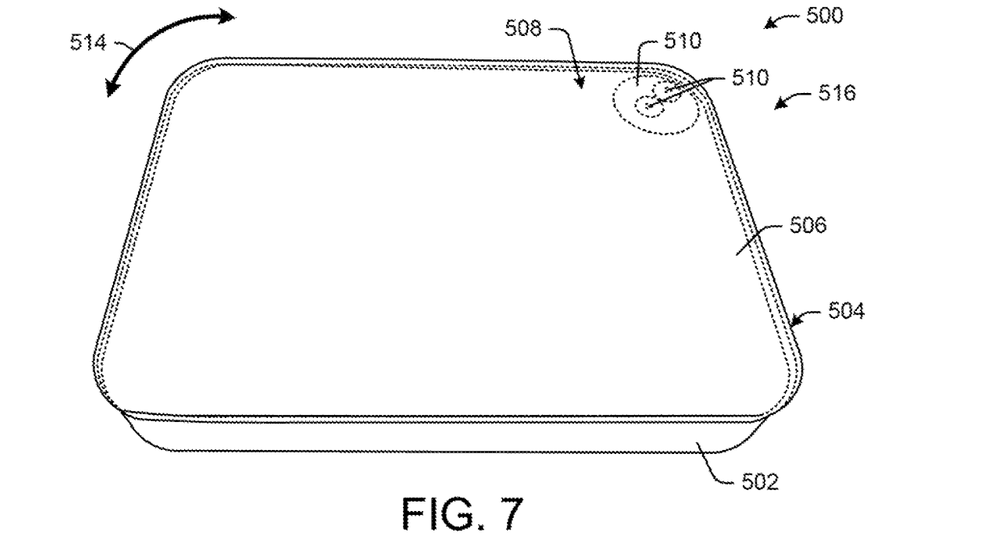
FIGS. 7 and 8 schematically depict a flat corner rotation mounted articulating POS display assembly in different positions in accordance with one or more embodiments of the disclosure.
Figure 8:
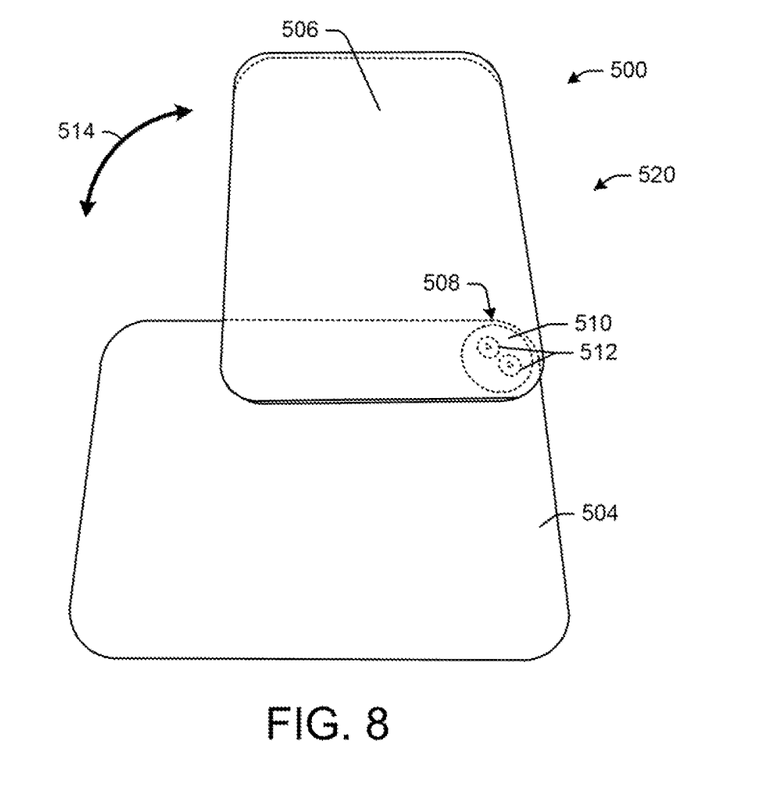

Now referring to FIGS. 7 and 8, a flat corner rotation mounted articulating POS display assembly 500 is depicted in accordance with one or more embodiments of the disclosure. In one embodiment, the articulating POS display assembly 500 may include a base 502, a pivotal joint 508 connected to a corner 510 of the base, and a POS display 506 attached to a surface 504 of the base 502 via the pivotal joint 508.

The pivotal joint 508 may include suction cups 512 that removably attach the POS display 506 to the base 502. The pivotal joint 508 may allow 360 degree rotation of the POS display 506 about the base 502, and may be, for example, a swivel joint. The pivotal joint 508 may be integrated into the base 502 or may otherwise be attached to the base 502 such that surface 504 remains substantially smooth. The pivotal joint 508 may allow the POS display 506 to rotate in directions 514 with respect to the base 502.

In some embodiments, the flat corner rotation mounted articulating POS display assembly 500 may enable the POS display 506 to be presented in landscape or portrait mode, depending on the state of the pivotal joint 508. For example, a merchant may view the POS display 506 in landscape mode while processing a transaction. The merchant may then exert force on the POS display 506 so that it swivels or rotates in direction 514 from the pivotal joint 508 connecting the base 502 and the POS display 506 such that when the POS display 506 is facing the customer, the POS display 506 may be in portrait mode from the customer's perspective. For example, the POS display 506 may be in a first position 514, or landscape mode as shown in FIG. 7, and upon rotating with respect to the base 502, the POS display 506 may be in a second position 520, or portrait mode as shown in FIG. 8. In the second position 520, the surface 504 of the base 502 may be exposed. Accordingly, functionality may be incorporated into the surface 504, for example, a drawer for currency may be positioned in the base 502 and may be accessible via the surface 504.

Figure 9:
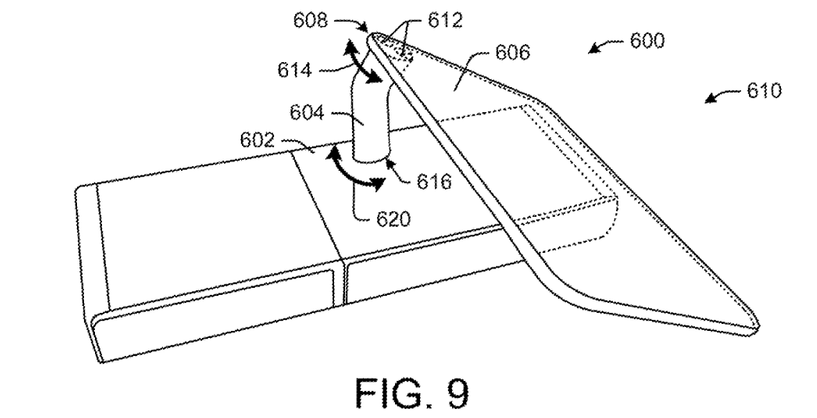
FIGS. 9 and 10 schematically depict an angled corner rotation mounted articulating POS display assembly in accordance with one or more embodiments of the disclosure.
Figure 10:
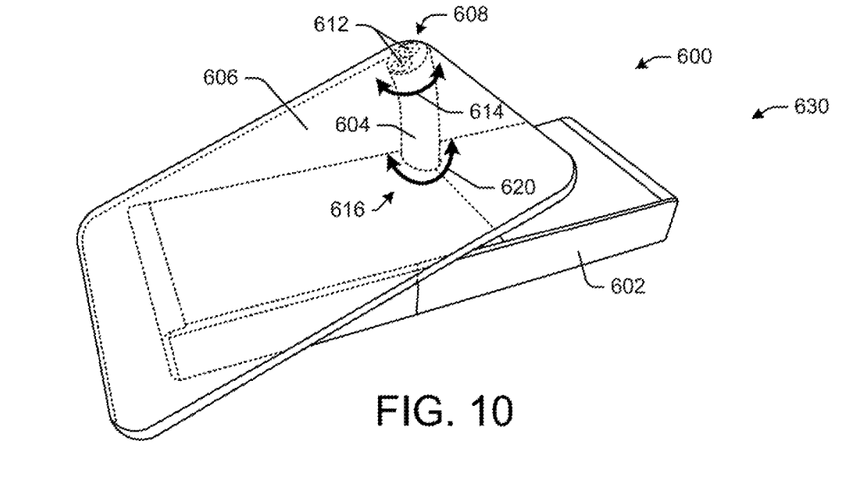

Now referring to FIGS. 9 and 10, an angled corner rotation mounted articulating POS display assembly 600 is depicted in a first position 610 in accordance with one or more embodiments of the disclosure. In one embodiment, the articulating POS display assembly 600 may include a base 602, a rotatable arm 604 attached to and extending from the base 602, and a POS display 606 attached to the rotatable arm 604 via a rotatable attachment 608.

The rotatable attachment 608 may be configured to allow the POS display 606 to rotate with respect to the rotatable arm 604. The rotatable attachment 608 may be configured to removably attach the POS display 606 to an end or other portion of the rotatable arm 604. For example, the rotatable attachment 608 may include suction cups 612 that allow the POS display 606 to be attached and removed from the rotatable arm 604. The rotatable attachment 608 may be configured to allow the POS display 606 to rotate in directions 614 about the rotatable arm 604, for example from landscape view to portrait view.

The rotatable arm 604 may be rotatably attached to the base 602, for example via swivel mount 616. The rotatable arm 604 may rotate with respect to the base 602 for example in directions 620. The rotatable arm 604 may allow 360 degrees of motion with respect to the base 602. In some embodiments, as shown in FIG. 9, the rotatable arm 604 may be bent, while in other embodiments, the rotatable arm 604 may be straight, curved, or angled. In some embodiments, the rotatable arm 604 may be extendable, allowing the POS display 606 to move away from the base 602 while remaining connected to the rotatable arm 604. For example, the rotatable arm 604 may have a telescoping portion.

In some embodiments, the angled corner rotation mounted articulating POS display assembly 600 may enable a merchant-facing mode, such as at the first position 610 shown in FIG. 9, to be at one angle (e.g., landscape mode). The assembly 600 may be manipulated (e.g., the display may be rotated) by a pre-determined angle (e.g., 90 degrees) and the display 606 may be put into a customer-facing mode (e.g., at a shallower angle in portrait mode) which may enable the customer to view the details of the transaction and sign or otherwise indicate via the POS display 606 approval of the transaction. In another instance, as shown in FIG. 10, the POS display 606 may be rotated with respect to the base 606 and can be moved to a second position 630, or in view of a customer for approval of a transaction.

The angled corner rotation mounted articulating POS display assembly 600 may be a single pivot axis rotation placed at a skew angle. The skew angle and the location of the intersection of the skew angle with respect to the base and the display may give the assembly unique properties of set angle in different modes. For example, the merchant mode may have set angles that are different than the set angles of the customer-facing mode. The angled corner rotation mount assembly may enable users to easily change the angle and orientation of the POS display from merchant mode to customer mode.

Figure 11:
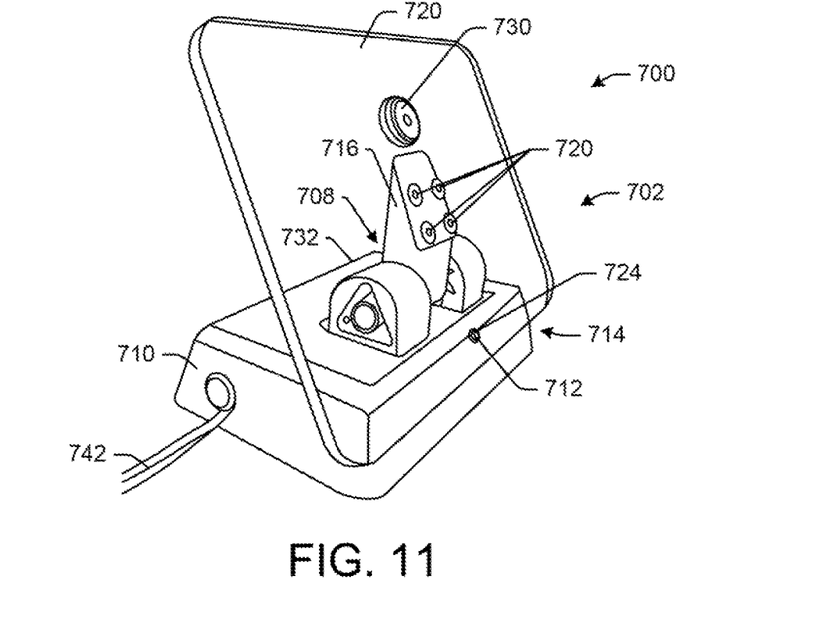
FIGS. 11-13 schematically depict a powered center-mounted horizontal pivot mounted articulating POS display assembly in different positions in accordance with one or more embodiments of the disclosure.
Figure 12:
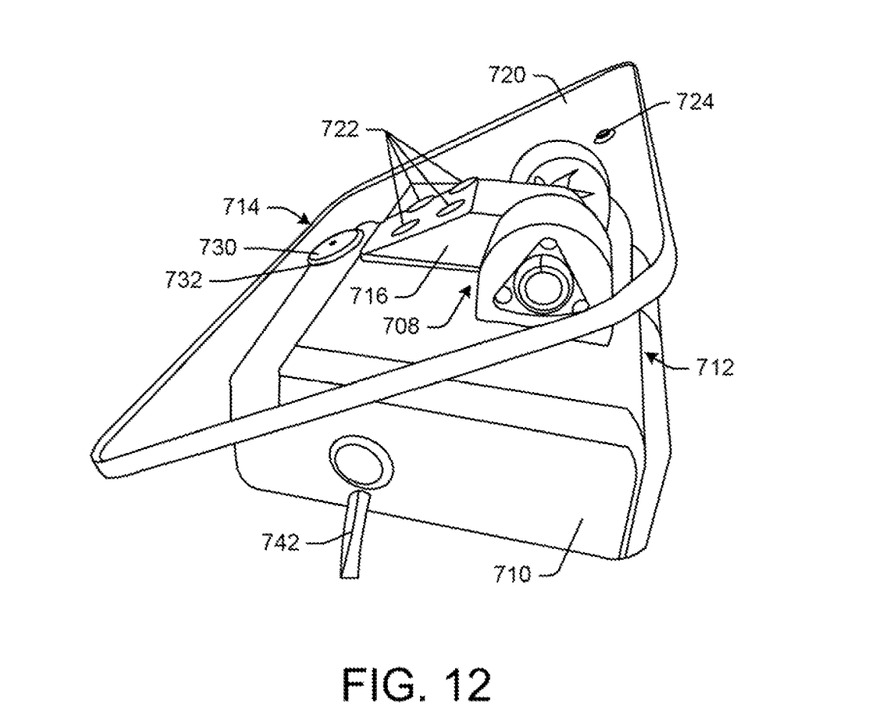
Figure 13:
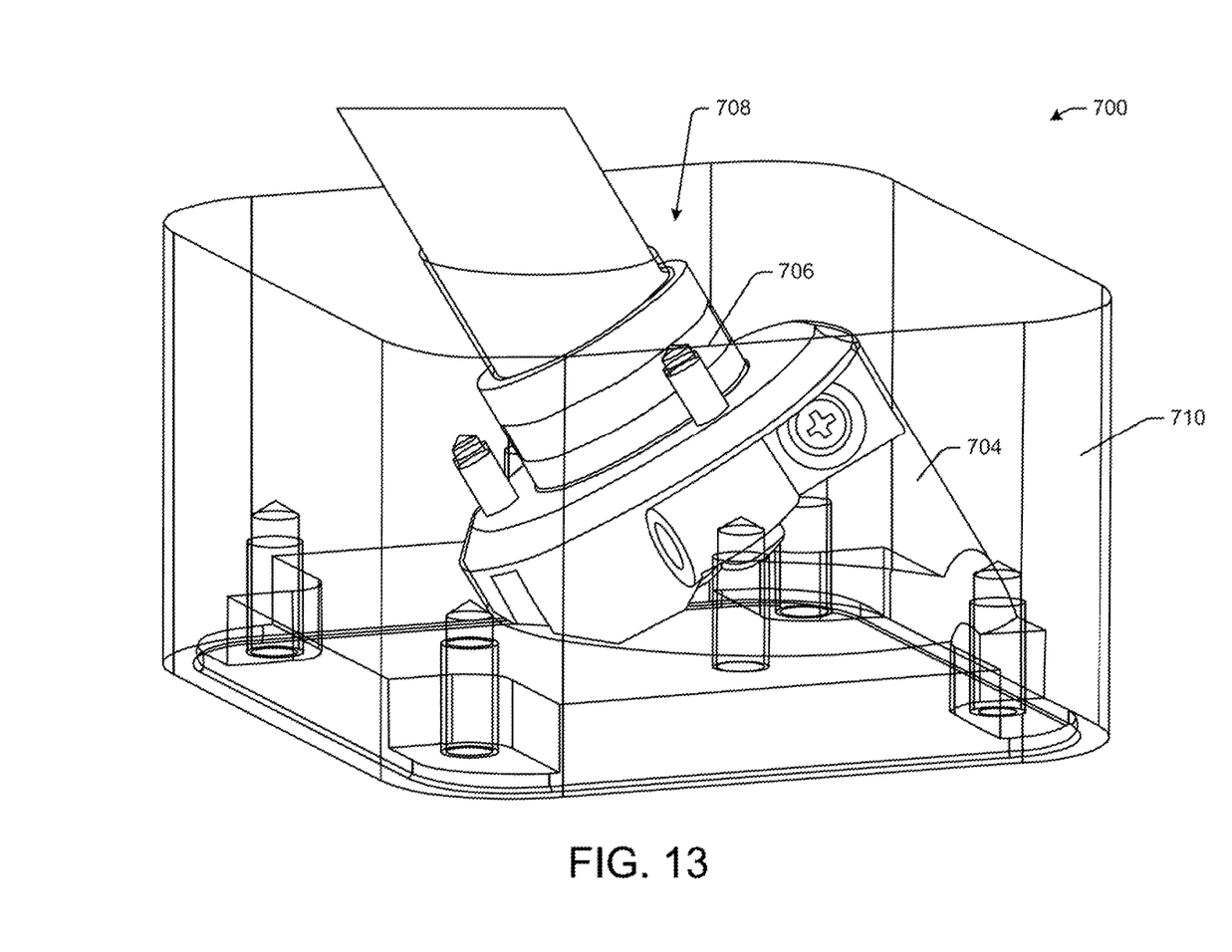

Now referring to FIGS. 11-13, a horizontal pivot POS display assembly 700 is depicted in a first position 702 in accordance with one or more embodiments of the disclosure. As shown in detail in FIG. 13, the POS display assembly 700 may include a spring 704, damper 706, and electromagnetic latch mount assembly 708. Referring to FIG. 11, in one embodiment, the articulating POS display assembly 700 may include a base 710 including a first portion 712 of a latch 714. The articulating POS display assembly 700 may include a pivotal spring-loaded arm 716 attached to the base 710. The articulating POS display assembly 700 may include a POS display 720 attached to the pivotal spring loaded arm 716, for example by suction cups 722 as discussed above. The POS display 720 may include a second portion 724 of the latch 714.

In some embodiments, the POS display assembly 700 may be spring loaded and may include a magnetic latch 714. When the articulating POS display assembly 700 is in a merchant mode, for example in the first position 702 illustrated in FIG. 11, and the merchant would like to present the POS display 720 to the customer, the customer may push a portion 730 of the POS display 720 down until the POS display 720 is latched, for example to the base 710, as shown in the second position 740 in FIG. 12. In some embodiments, the latch 714 may comprise a magnet 730 affixed to a portion of the POS display 720 and a second magnet 732 affixed to a portion of the base 710. The second magnet 732 affixed to the portion of the base 710 may have an inductor coil wrapped around it. The inductor coil may be energized in a manner that nullified the magnetic field of the second magnet 732 of the base 710 which may permit the magnetic latch 714 to release. The inductor coil may be energized by a hardware or software switch. For example, power supply 742 may be used.

Figure 14:
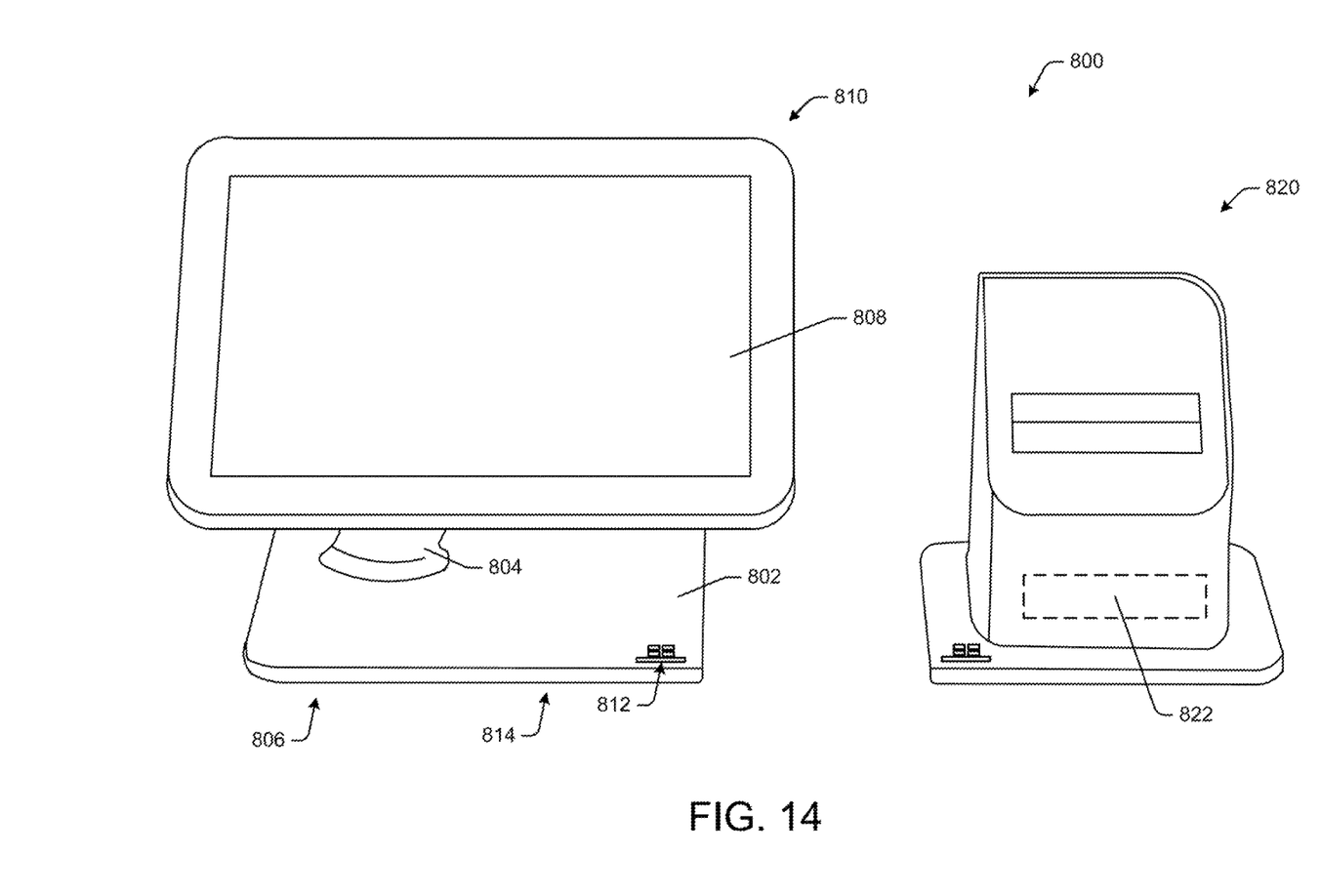
FIG. 14 schematically depicts a stationary mounted articulating POS display assembly in communication with a printer in accordance with one or more embodiments of the disclosure.

Now referring to FIG. 14, a POS display system 800 may include a stationary mounted articulating POS display assembly 810 in communication with an integrated or nearby printer 820. In one embodiment, the articulating POS display assembly 810 may include a base 802, an arm 804 extending from the base 802 and positioned toward a first side 806 of the base 802, and a POS display 808 comprising a card reader 812 positioned on a second side 814 of the base 802 opposite the first side 806 of the base 802.

In some embodiments, the POS display 808 may be a touch screen display integrated with a card swipe reader 812. The POS display 808 may be in communication with the integrated receipt printer 820. The POS display 808 may be part of an articulating POS display assembly as described herein where the base 802 may be wider than in other embodiments. The wide base 802 may be needed to provide stability to the POS display 808 and to compensate for the swiping of the credit cards in the card reader 812 without knocking over or otherwise damaging the POS display 808 and/or to provide stability and compensate for any movement of the base 802 that may occur when articulating the POS display 808 into different states.

In some embodiments, the integrated receipt printer 820 may include a printed circuit board assembly 822 that may act as a hub for the input/output (I/O) for the POS system 800. The printer 820 may include a system power supply, Ethernet cable, and RJ11 connector that may be integrated in the unit, additional USB ports for expansion capabilities (e.g., for weigh scales or third-party 1-D or 2-D barcode reader). In some embodiments, a dedicated line may connect the POS display 808 and the printer 820 or the POS display 808 and printer 820 may be connected wirelessly over a wireless protocol.

According to one embodiment of the disclosure, an articulating point-of-sale (POS) display assembly can include a base, a first arm and a second arm. The first arm and second arm extend substantially orthogonally from the base and on opposite ends of the base. The assembly also includes a POS display pivotally attached to the first arm and the second arm, wherein the POS display has a horizontal pivot axis through a centerline of the POS display.

According to one embodiment of the disclosure, an articulating point-of-sale (POS) display assembly can include a base with a front angled portion and a rear angled portion. The assembly includes an adjustable arm extending from the base, where the arm includes a first arm joint configured for pivotal attachment to the display and a second arm joint configured for pivotal attachment to the base. The assembly also includes a POS display pivotally attached to the second arm joint. The POS display is adjustable to rest on one of the front angled portion of the rear angled portion of the base.

According to one embodiment of the disclosure, an articulating point-of-sale (POS) display assembly can include a base, and a plurality of arms extending from the base and pivotal attached to the base. Each of the plurality of arms includes an arm joint configured for adjustable attachment to a POS display. The POS display may be attached to each of the plurality of arms via the respective arm joint of the plurality of arms.

According to one embodiment of the disclosure, an articulating point-of-sale (POS) display assembly can include a base and an arm extending from the base. The arm includes a first portion substantially orthogonal to the base and a second portion at a skew angle, and an arm joint on the second portion of the arm. The assembly includes a POS display attached to the arm joint.

According to one embodiment of the disclosure, an articulating point-of-sale (POS) display assembly can include a base, a pivotal joint connected to a corner of the base, and a POS display attached to the base via the pivotal joint.

According to one embodiment of the disclosure, an articulating point-of-sale (POS) display assembly can include a base and a rotatable arm extending from the base. The arm includes a first portion substantially orthogonal to the base and a second portion at a skew angle, a hinge on the second portion of the rotatable arm, and a POS display attached to the rotatable arm via the hinge.

According to one embodiment of the disclosure, an articulating point-of-sale (POS) display assembly can include a base comprising a first portion of a latch, a pivotal spring-loaded arm attached to the base, and a POS display attached to the pivotal spring-loaded arm, wherein the POS display comprises a second portion of the latch.

According to one embodiment of the disclosure, an articulating point-of-sale (POS) display assembly can include a base, an arm extending from the base and positioned toward a first side of the base, and a POS display comprising a card reader positioned on a second side of the based opposite the first side of the base.

Associated methods of use and manufacture of the assemblies described herein are included in this disclosure.

According to one embodiment of the disclosure, an articulating point-of-sale (POS) display assembly may include a base and a movable arm attached to the base. The movable arm may be configured to move from a first position to a second position with respect to the base. The assembly may further include a pivotable display device attached to the movable arm. The pivotable display device may be configured to pivot from a third position to a fourth position with respect to the movable arm. The assembly may also include an arm joint attaching the movable arm to the base, and a pivot joint attaching the pivotable display device to the movable arm. The movable arm may be configured to rotate with respect to the base. The arm joint may be configured to allow the movable arm to rotate 360 degrees about the base. The pivotable display device may be configured to lock in the third position or the fourth position. The pivotable display device may be configured to rotate about the movable arm. The movable arm may include a telescoping arm portion. The pivotable display device may be removably attached to the movable arm. The pivot joint may include one or more suction cups to attach the pivotable display device to the movable arm. The movable arm may be configured to lock in the first position or the second position. The movable arm may include a straight portion and an angled portion. The base may include a backstop for the pivotable display device at either the third position or the fourth position. The arm joint may be positioned near a corner of the base. The pivotable display device may further include a first magnetic latch portion and the base may further include a second magnetic latch portion, the first and second magnetic latch portions may be configured to engage and lock the pivotable display device in the third position or the fourth position. The pivotable display device may be configured to rotate about the base. The assembly may further include an integrated printer, where the base further includes a card reader and the pivotable display device may be configured to communicate with the integrated printer.

According to one embodiment of the disclosure, a method for providing an articulating point-of-sale (POS) display assembly can include providing a base, attaching a movable arm to the base with an arm joint. The movable arm may be configured to move from a first position to a second position with respect to the base, and attaching a pivotable display device to the movable arm with a pivot joint. The pivotable display device may be configured to pivot from a third position to a fourth position with respect to the movable arm. The pivotable display device may be configured to rotate with respect to the movable arm. The movable arm may be configured to rotate with respect to the base.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

Although the disclosure has been described in language specific to structural features and/or methodological acts, it is to be understood that the disclosure is not limited to the specific features or acts described. Rather, the specific features and acts are disclosed as illustrative forms of implementing the disclosure.

That which is claimed is:

1. An articulating point-of-sale (POS) display assembly, comprising:
a base; a rotatable arm attached to the base, the rotatable arm comprising a first portion with a first end and a second portion with a second end, wherein the rotatable arm is bent such that the first portion is angled and fixed with respect to the second portion, the rotatable arm configured to rotate from a first position to a second position about a perpendicular axis with respect to the base; a pivotable display device attached to the first end of the rotatable arm via a pivot joint located at or near a corner of the pivotable display device, the pivotable display device configured to pivot from a third position to a fourth position with respect to the rotatable arm; and an arm joint at the second end of the rotatable arm attaching the rotatable arm to the base; wherein the pivot joint attaches the pivotable display device to the rotatable arm; and when the rotatable arm is in the first positon, the pivotable display is at a landscape position with a first edge aligned with a first edge of the base, and when the rotatable arm is in the second positon, the pivotable display is at a portrait position with a second edge, which is adjacent to the first edge, aligned with an edge opposite the first edge of the base.

2. The articulating point-of-sale (POS) display assembly of claim 1, wherein the rotatable arm is configured to rotate three hundred sixty degrees about the perpendicular axis with respect to the base.

3. The articulating point-of-sale (POS) display assembly of claim 1, wherein the pivotable display device is configured to pivot to predetermined locked positions about the rotatable arm.

4. The articulating point-of-sale (POS) display assembly of claim 1, wherein the pivotable display device is configured to lock in the third position or the fourth position.

5. The articulating point-of-sale (POS) display assembly of claim 1, wherein the first portion of the rotatable arm is substantially perpendicular to the base and the second portion is bent at an obtuse angle away from the first portion.

6. The articulating point-of-sale (POS) display assembly of claim 1, wherein the pivotable display device is removably attached to the rotatable arm.

7. The articulating point-of-sale (POS) display assembly of claim 6, wherein the pivot joint comprises one or more suction cups to attach the pivotable display device to the rotatable arm.

8. The articulating point-of-sale (POS) display assembly of claim 1, wherein the rotatable arm is configured to lock in the first position or the second position.

9. The articulating point-of-sale (POS) display assembly of claim 5, wherein the second portion of the rotatable arm is configured to rotate with respect to the first portion of the rotatable arm.

10. The articulating point-of-sale (POS) display assembly of claim 1, wherein:
the pivotable display device further comprises a first magnetic latch portion; and
the base further comprises a second magnetic latch portion, wherein the first and second magnetic latch portions are configured to engage and lock the pivotable display device in the third position or the fourth position.

11. The articulating point-of-sale (POS) display assembly of claim 5, wherein the pivotable display device is configured to rotate about the second portion of the rotatable arm.

12. The articulating point-of-sale (POS) display assembly of claim 1, further comprising an integrated printer, wherein the base further comprises a card reader and the pivotable display device is configured to communicate with the integrated printer.

13. A method for providing an articulating point-of-sale (POS) display assembly comprising:
Providing a base;
attaching a rotatable arm with a first portion with a first end and a second portion with a second end to the base with an arm joint, the rotatable arm configured to rotate from a first position to a second position about a perpendicular axis with respect to the base, wherein the second portion of the rotatable arm is bent such that the first portion is angled and fixed with respect to the second portion; and attaching a pivotable display device to the first end of the rotatable arm with a pivot joint located at or near a corner of the pivotable display device, the pivotable display device configured to pivot from a third position to a fourth position with respect to the rotatable arm, wherein the pivot joint is configured to pivot to predetermined positions; wherein the pivotable display device is configured to rotate with respect to the second portion of the rotatable arm; and the rotatable arm is configured to rotate three hundred sixty degrees about the perpendicular axis with respect to the base; and when the rotatable arm is in the first positon, the pivotable display is at a landscape position with a first edge aligned with a first edge of the base, and when the rotatable arm is in the second positon, the pivotable display is at a portrait position with a second edge, which is adjacent to the first edge, aligned with an edge opposite the first edge of the base.

* * * * *